(No Model.)
J. TIMMS.
CAR AXLE BOX.
No. 277,382. Patented May 8, 1883.
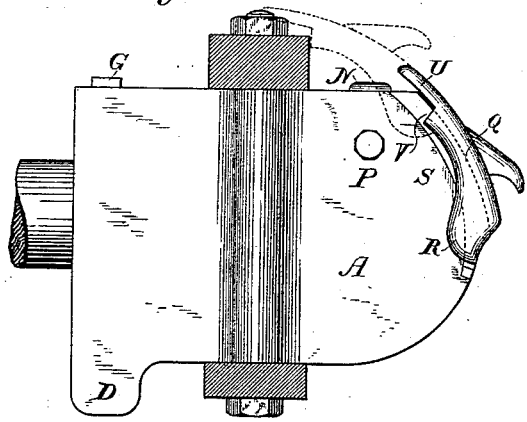
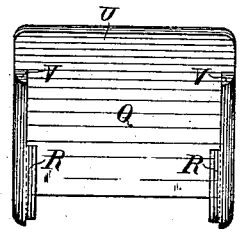
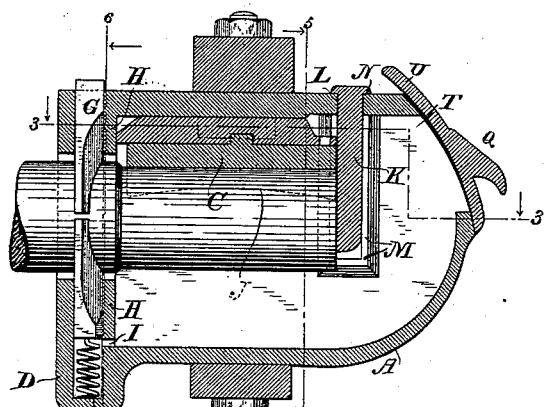
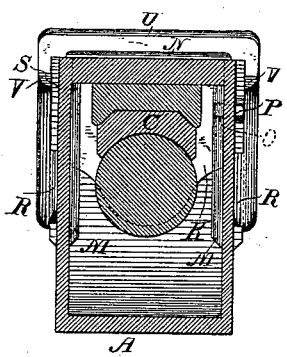
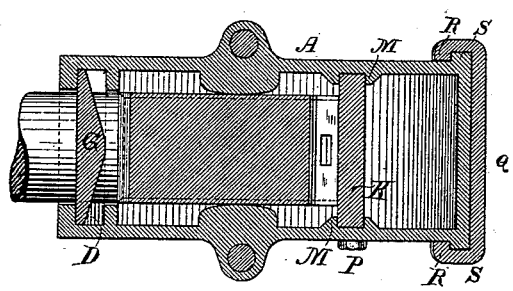
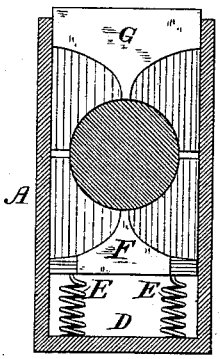
WITNESSES
Wm A. Skinkle
H. W. Elmore
INVENTOR
James Timms
By his Attorneys,
Baldwin, Hopkins & Peyton

UNITED STATES PATENT OFFICE.

JAMES TIMMS, OF COLUMBUS, OHIO.

CAR-AXLE BOX.

SPECIFICATION forming part of Letters Patent No. 277,382, dated May 8, 1883.

Application filed February 19, 1883. (No model.)

*To all whom it may concern:*

Be it known that I, JAMES TIMMS, of Columbus, in the county of Franklin and State of Ohio, have invented certain new and useful Improvements in Car-Axle Boxes, of which the following is a specification, reference being had to the accompanying drawings, in which—

Figure 1 is a side elevation. Fig. 2 is a vertical section. Fig. 3 is a section on the line 3 3 of Fig. 2. Fig. 4 is a bottom view of the sliding cap. Fig. 5 is a section on the line 5 5 of Fig. 2, and Fig. 6 is a section on the line 6 6 of Fig. 2.

Referring to the letters upon the drawings, A indicates the axle-box; B, a section of an axle; C, the brass or bearing, and D a hollow or recessed projection upon the lower side of the inner end of the box. This projection is for the purpose of receiving the springs E of the spring-packing F. The spring-packing F is of peculiar construction, designed by its shape to prevent the lubricant from working out of the box and to keep it within. Its springs cause it to bear snugly against the axle or the "dust-collar," as it is termed, which it is made to accurately fit. The inclines from the sides of the packing or plate toward its center cause it to wipe the oil inward to the central point, whichever way the axle may be turning. The oil will accumulate at this point and drop into the bottom of the packing-chamber, on account of the accumulation, at a definite point. The tendency, therefore, of the oil to work outside of the packing is greatly diminished, and, in fact, practically prevented altogether.

G indicates the top packing, similar in construction to the spring-packing F, and operating in a similar manner to accumulate the lubricant at the center of the packing, where an approximate point or edge is formed by the inclined cut-away portions on either side. This top packing serves to wipe the oil inward, whichever way the axle may be turning, and to pile it up on top of the axle or dust-collar, and keep it away from the packing, so that as it accumulates in sufficient quantity it will drop from the bottom of the axle or dust-collar as it revolves, especially as it comes in contact on the under side of the axle constantly with the accumulated oil wiped inward by the lower spring-packing, F. These combined packings, each encircling one-half the dust-collar and meeting on a line with the horizontal center of the axle, working together, as above described, serve in practice to wholly prevent the escape of oil outside of the axle-box.

At the lower end of the inner partition, H, is a small opening, I, to permit the lubricant to run inward from the packing-chamber into the oil-box proper, where it will be absorbed by the waste and applied again to lubricate the journal of the axle.

I cut away my brass or bearing upon its opposite sides, as indicated at J, so that its opposite edges shall incline inward toward its center. The result is that the lubricant tends to flow inward toward the center of the brass in whichever direction the axle may be rotated, and consequently more perfect lubrication is effected.

In order to hold the brass in place and to prevent lateral motion of the journal under the bearing by the derangement of the relations of the journal and bearing, I provide a rigid plate or end bearing, K, against which the outer ends of the brass and journal impinge. This plate is inserted in an aperture, L, in the top of the box, and is held in suitable guideways, M, upon either side of the inner walls of the box. It is provided with a flange or cap, N, at its top to fit dust and oil tight upon the box. It is also provided with a recess, O, into which a set-screw, P, or a pin may be inserted from the outside of the box to secure it in place.

I provide an improved curved sliding cap, Q, to cover the ordinary opening in the outer end of the oil-box for the insertion of lubricating material. Heretofore such sliding caps have generally been formed so that when they are raised to open the end of the box they will impinge at their outer edges against the arch-bars or frame-work over the box. The result is in practice that they soon become worn away upon their lugs R and upon the guideways S, so that they drop down too far and leave an opening at the point T, through which dust, sand, or water readily enters into the oil-box. To overcome these difficulties I employ an extension, U, upon the upper side of the cap, which projects sufficiently above the top of the box to compensate for any wear of the lugs or guideways, which will permit the cap to gradually drop down below its original position for closing the opening in the end of the box. This extension in itself, however, is not new, and I do not claim it, broadly. I also provide that this extension shall ride up over the arch-bar or frame-piece on top of the box, and I form shoulders or stops, V, upon either side of the cap, which shall impinge against the arch-bar or frame when the cap is raised. The consequence is that as the lugs and slides or guideways wear away and permit the cap to come down lower and lower, the extension of the cap serves to keep the opening at the top of the box tightly closed.

Heretofore oil-boxes have generally been formed with a downwardly-projecting lug upon the inside of their top plates, for the purpose of entering a corresponding recess in the brass to hold it in place. This construction necessitates the forming of a larger opening upon the inner end of the box, or one more elongated vertically, to accommodate the insertion of the bearings than is necessary where such a lug is dispensed with. Accordingly I employ a box having the inside of its top plate a plain surface without any downwardly-projecting lug; but I do not claim such a box to be broadly new.

I employ the plate or end bearing, K, to hold the brass in place at its outer end, the inner end of the brass impinging against the collar upon the axle. The result is that the axle-opening at the inner end of the box need be but very slightly elongated vertically; in fact, may be almost circular, allowing only a slight elongation to compensate for wear of the brass.

Having thus described the construction, operation, and advantages of my improvements, what I claim to be new, and desire to secure by Letters Patent of the United States, is—

1. The combination of the upper and lower packings, F and G, cut away upon their opposite sides to form inclined surfaces and central points or projections, substantially as and for the purposes set forth.

2. In combination with the journal, axle-box, and brass, the capped end bearing, K, against which the outer ends of the brass and journal impinge, and the guideways M and pin P, substantially as and for the purpose set forth.

3. In combination with the axle-box having the guideways S, the curved sliding cap Q, provided with the lugs R, and extension U and stops V, substantially as and for the purposes set forth.

In testimony whereof I have hereunto subscribed my name this 17th day of February, A. D. 1883.

JAMES TIMMS.

Witnesses:
   MARCUS S. HOPKINS,
   JOSEPH I. PEYTON.